United States Patent [19]

Ost

[11] 4,268,859
[45] May 19, 1981

[54] HIGH-SECURITY CABLE TELEVISION ACCESS SYSTEM

[76] Inventor: Clarence S. Ost, 7905 Bayshore Dr., Margate City, N.J. 08402

[21] Appl. No.: 58,016

[22] Filed: Jul. 16, 1979

Related U.S. Application Data

[63] Continuation-in-part of Ser. No. 798,409, May 19, 1977, Pat. No. 4,161,751.

[51] Int. Cl.³ .............................................. H04N 7/16
[52] U.S. Cl. ...................................... 358/114; 358/84; 358/115; 358/117; 358/122
[58] Field of Search ................ 358/114, 115, 117, 84, 358/86, 122

[56] References Cited

U.S. PATENT DOCUMENTS

| | | | |
|---|---|---|---|
| 3,130,265 | 4/1964 | Leonard | 358/86 |
| 3,230,302 | 1/1966 | Bruck et al. | 358/84 |
| 3,586,771 | 6/1971 | Hamburger | 358/116 |
| 3,668,307 | 6/1972 | Face et al. | 358/86 |
| 3,836,888 | 9/1974 | Boenke et al. | 358/86 |
| 3,886,302 | 5/1975 | Kosco | 358/114 |
| 3,934,079 | 1/1976 | Barnhart | 358/86 |
| 3,968,327 | 7/1976 | Gregg | 358/86 |
| 3,975,585 | 8/1976 | Kirk, Jr. et al. | 358/86 |
| 4,008,369 | 2/1977 | Theurer et al. | 358/117 |

*Primary Examiner*—Stephen C. Buczinski
*Attorney, Agent, or Firm*—Charles A. McClure

[57] ABSTRACT

A poach-resistant system enabling cable television subscribers to receive upon request certain programs otherwise unavailable (i.e., "secure") while precluding such reception by non-requesting subscribers as well as non-subscribers. Before transmission of such a secure program the roster of subscribers is scanned at a central control station having compiled subscribers' requests for that program, and a resulting string of pulses corresponding in sequence to the respective subscribers is punctuated with program command pulses timed to designate those subscribers who have requested the program. Transmission of the resultant program command signal string over the cable to junctions with leads to the respective subscribers' television sets results in unblocking of such junction for each of the requesting subscribers only.

7 Claims, 7 Drawing Figures

HIGH-SECURITY CABLE TELEVISION ACCESS SYSTEM

This is a continuation-in-part of my copending application, Ser. No. 798,409 filed May 19, 1977 now U.S. Pat. No. 4,161,751.

This invention relates to control of access to wired or similarly channeled program transmission, a prominent example being subscriber cable television, wherein reception is blocked to non-requesting subscribers and is unblocked to requesting subscribers, usually on a program-by-program basis and with corresponding accrual of charges to be paid by the requesting subscribers. Such programs may be termed "secure" to distinguish them from programs otherwise readily available to subscribers. Inasmuch as this application is concerned specifically therewith it will be understood that in the absence of contrary designation herein any program mentioned is intended to be a secure program even if not so identified.

Numerous attempts to control access to subscription cable television program transmission have been made but have proved largely unsuccessful for a variety of reasons, such as being on the one hand so simple as to be readily defeated at a subscriber's television receiver, or on the other hand so complex as not to be suited for use with existing cable setups. Easy poaching by non-paying subscribers or outsiders renders presentation of expensive programs uneconomical, whereas costly reworking of the lines to accommodate a complex control system is not even economically feasible. Inability to resolve that dilemma has precluded subscription cable television from presenting the anticipated quality and range of programs and has resulted in considerable subscriber dissatisfaction and consequent constraint upon expansion of cable television.

A primary object of the present invention is provision of a highly secure system for controlling access to cable television or similarly channeled communication programs.

Another object of this invention is a poach-resistant access control system readily installable in existing cable television facilities with minimal modification.

A further object of the invention is embodiment of components of such access control system in an outside junction between the cable and the lead to each subscriber's television receiver.

Other objects of the present invention, together with means and methods of attaining the various objects will be apparent from the following description and the accompanying diagrams of a specific embodiment thereof, which is presented by way of example rather than limitation.

In general, the objects of the present invention are accomplished, by a system of withholding and alternatively providing to cable television subscribers access to programs transmitted over the cable, wherein such access is normally precluded by blocking the junction between the cable and the further pathway to any given subscriber's television receiver. It comprises recording program requests from identified subscribers, storing in a memory for each such program the identity of each subscriber requesting access thereto, retrieving from the memory preparatory to transmitting such program the identity of each subscriber having requested access to such program transmission, coding such requests in signal form and transmitting the resultant signal string via the cable to the junctions thereof with the further pathways to the respective subscribers' television receivers, detecting at each subscriber's junction whether the signal string contains a coded request by such subscriber for access to such program and, if so, unblocking the junction to enable such program to be transmitted therethrough and along the further pathway to such subscriber's television receiver. This method effectively defines secure programs.

More particularly, the invention provides a method of providing, to requesting cable television subscribers, access to such secure program signals transmitted over the cable and via interconnections including tap offs and down leads to the subscribers' television receivers. It does so by generating a string of clocking pulses corresponding to serial numbering of all the subscribers, combining program command pulses with the clocking pulses corresponding to the respective requesting subscribers in the clocking string and thereby producing a program command signal string, transmitting the program command signal string via the cable to each of the subscribers' tap offs, and at each subscriber's tap off separating the command pulses from the clocking pulse string, generating a pulse characteristic of such subscriber's number clocked synchronously with the clocking pulse string, and utilizing each requesting subscriber's command pulse, in coincidence with that subscriber's characteristic pulse, to gate the requested program signals to that subscriber's television receiver.

This invention, in apparatus embodiment of the foregoing system and method, features an interconnecting poach-resistant tap off, between the cable and the down lead to a subscriber's television receiver, comprising means for blocking program transmission from the cable to the down lead, means for inactivating the blocking means, and control means including signal-responsive structure identifiable with the given subscriber rather than any other subscriber and adapted to decode a correspondingly identified command pulse from a command pulse signal string transmitted from the station over the cable, the control means also including means responsive to such decoded command pulse and effective to inactivate the blocking means and thereby receive program transmission.

Figure 1:
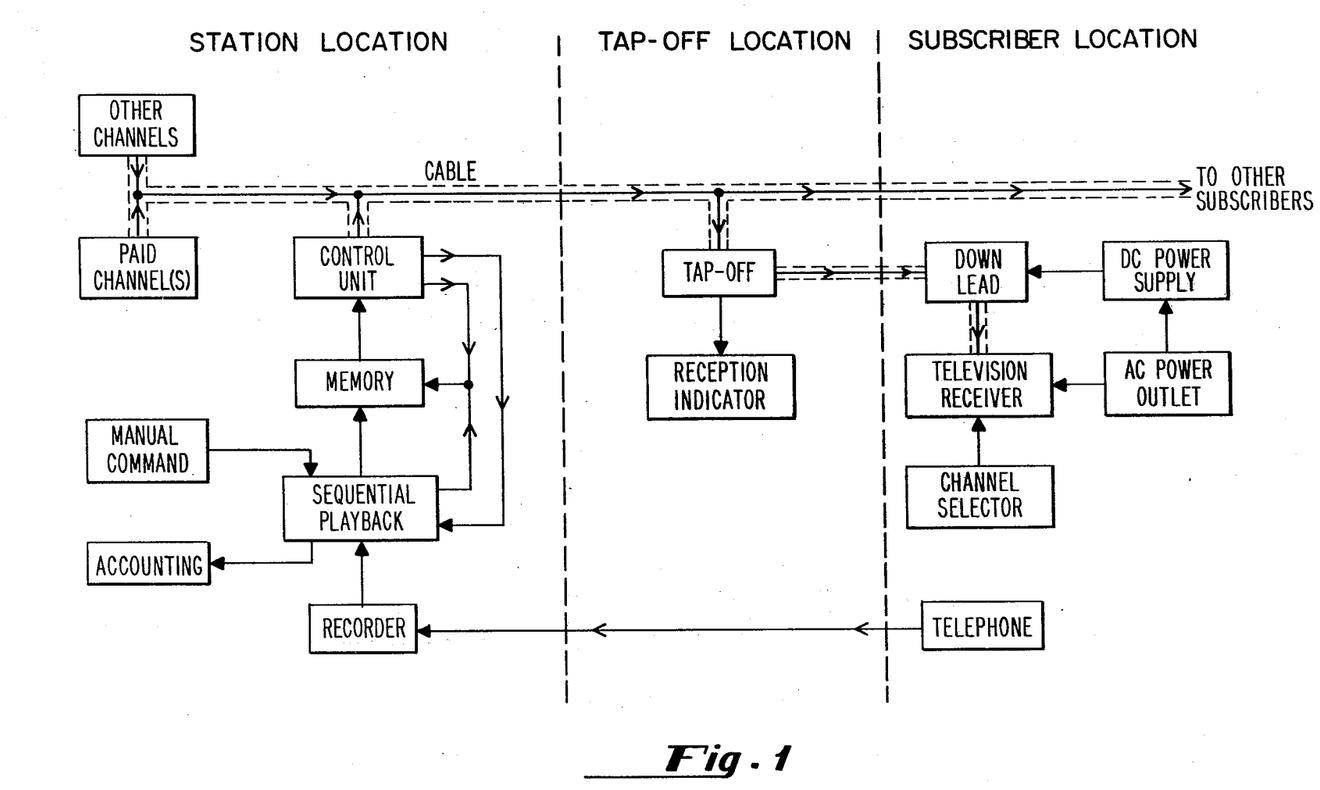
FIG. 1 is a block diagram of the interrelation of components useful in the practice of this invention from a cable television station to a subscriber's location.

FIG. 1 shows schematically apparatus components useful according to this invention, with those at or in the vicinity of a transmitter or central control station grouped at the left, with those at a subscriber's location grouped at the right, and with the cable extending therebetween, and to an intervening tap off junction.

At the STATION LOCATION a RECORDER receives the subscriber's requests (from a TELEPHONE at the subscriber's location) each other subscriber also having telephone or other access to the recorder. A SEQUENTIAL PLAYBACK unit is located between the RECORDER and a MEMORY and is adapted, upon MANUAL COMMAND or a signal from the CONTROL UNIT to which the MEMORY is connected, to update the memory with identification of subscribers requesting program access and is adapted also to actuate automatic ACCOUNTING equipment so as to ensure that those subscribers are billed for the requested program. The CONTROL UNIT output is connected to the CABLE, as are the PAID CHANNEL(S) and any OTHER CHANNELS of program transmission.

At the intervening SUBSCRIBER LOCATION a TAP OFF at the junction with the CABLE connects with a DOWN LEAD to the subscriber's TELEVISION RECEIVER. An AC POWER OUTLET supplies the TELEVISION RECEIVER and also a DC POWER SUPPLY (low voltage) connected to the DOWN LEAD to power the control circuitry in the TAP OFF, which has a RECEPTION INDICATOR associated therewith. A CHANNEL SELECTOR enables selection of one from among a plurality of secure PAID CHANNELS when present. Also here is the subscriber's TELEPHONE already mentioned as useful in transmitting program requests which alternatively might be delivered in person, by mail, etc., and recorded in like manner—or be sent via the TV cable in a compatible bilateral system.

Figure 2:
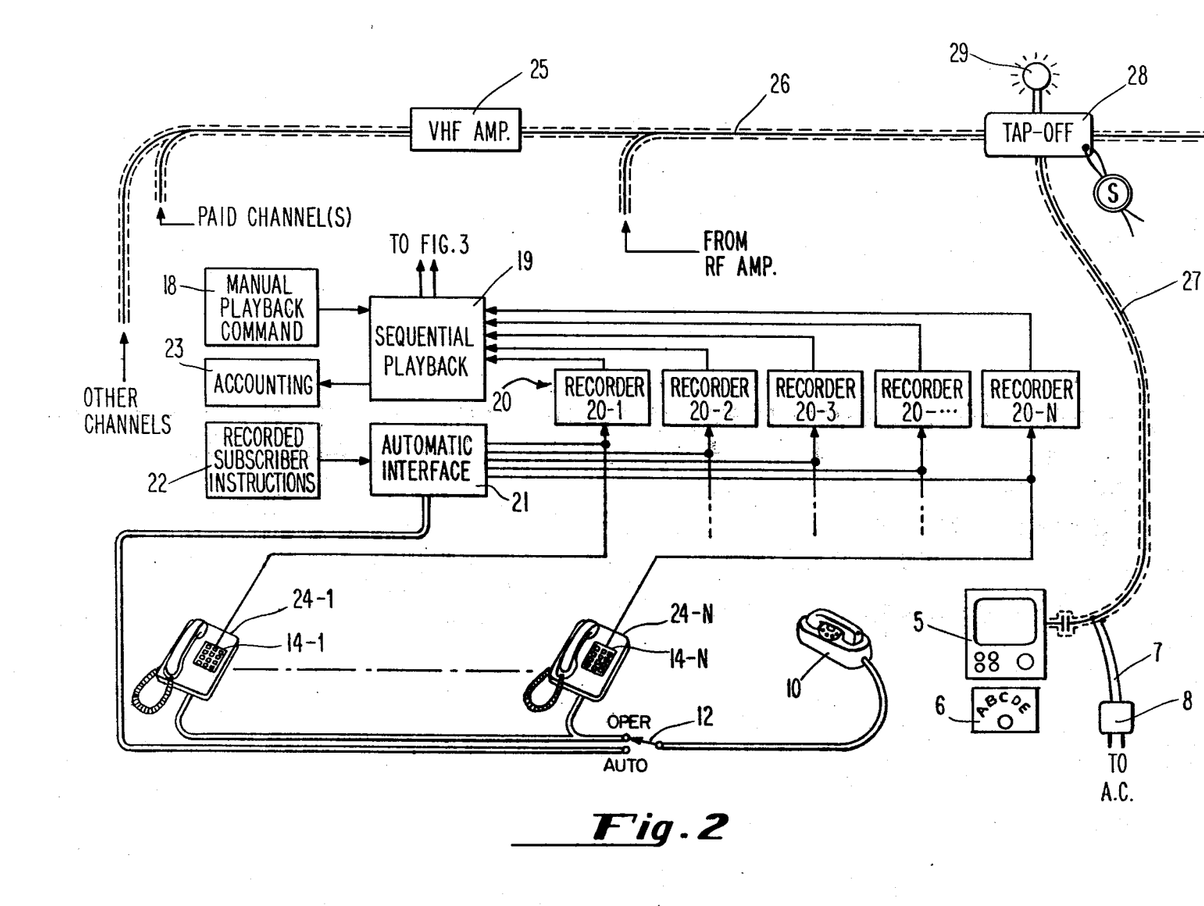
FIG. 2 is a largely schematic but partly pictorialized view of communications means arranged similarly to FIG. 1.

FIG. 2 shows much of the apparatus and interconnection indicated in the preceding view, some of it more pictorially and some of it in greater detail. A subscriber's telephone 10 is connected to switch 12, shown in operator position, further connected through a plurality of keysets 24-1 to 24-N, with respective touch-tone keyboards 14-1 to 14-N for from 1 to N operators to use in recording any given subscriber's program request in one of corresponding set of recorders 20. Any suitable number may be used commensurate with the request load: designated here as RECORDER 20-1, RECORDER 20-2, RECORDER 20-3, ... RECORDER 20-N. In the alternative AUTOmatic position of switch 12 a subscriber's call so received is exposed to RECORDED SUBSCRIBER INSTRUCTIONS 22 prescribing the form and content of a request, which so given is routed through AUTOMATIC INTERFACE unit 21 to one of the recorders. The recorders' output is made available via Sequential Playback means 19, as at the instance of Manual Playback Command means 18, to the central control unit in FIG. 3.

Cable 26 receives transmitted TV program via secure PAID CHANNEL(S) and OTHER CHANNELS through VHF AMP 25 and proceeds to the indicated subscriber's TAP OFF 28 at the junction with that subscriber's down lead 27 to television receiver 5 (FIG. 2). Also connected to the down lead is low-voltage dc power lead 7 supplied by dc power supply 8 connected to an ac outlet, thereby energizing the TAP OFF via the down lead. Visual indicator 29 on the TAP OFF is provided to indicate secure program reception. The TAP OFF is provided with seal S as an indication of construction that cannot be opened without breaking the seal. The TAP OFF is shown on part of the cable suspended in the air as a further deterrent to tampering. Of course, if a cable is underground rather than above ground the tap off can be located in a locked pedestal, where it would be accessible only to authorized personnel.

Channel selector 6 is useful in selecting from among a plurality of simultaneous secure paid programs whose transmission via a corresponding plurality of channels is unblocked to the television receiver. Such selection may be made by filter selection, by frequency conversion through action of a local oscillator, or through other appropriate action of the channel selector which is shown with five selection positions: A, B, C, D, and E. If only a single secure paid channel is unblocked, no selection action would be in order.

Figure 3:
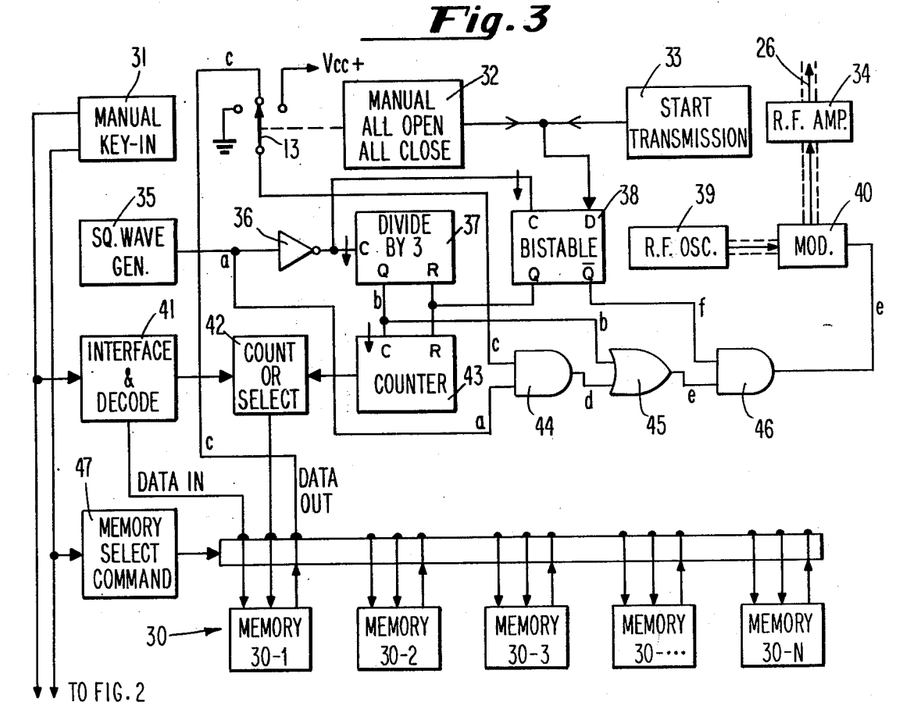
FIG. 3 is a circuit diagram, largely in component block form, of access control means located centrally and corresponding to the control unit of FIG. 1.

FIG. 3 shows the CONTROL UNIT of FIG. 1, comprising circuitry such as is conveniently located at or in the vicinity of a cable television station or similar central location. Here there are a plurality of memory units 30: designated as MEMORY 30-1, MEMORY 30-2, MEMORY 30-3, ... MEMORY 30-N. Each such memory can store the identification of subscribers requesting access to a given program, together with suitable indication of such request. Each such memory may be connected into the rest of the circuit by MEMORY SELECT COMMAND unit 47, and MEMORY 30-1 is shown so connected to receive DATA IN via INTERFACE AND DECODE unit 41 from the recorders via SEQUENTIAL PLAYBACK unit 19 shown in FIG. 2, and directed to the proper address(es) by the SELECT part of COUNT OR SELECT unit 42. These various components are subject to actuation by MANUAL KEY-IN unit 31 connected as shown in FIGS. 2 and 3, which is also adapted to actuate the COUNT part of unit 42 so as to provide DATA OUT to switch 13 and therethrough to the rest of the CONTROL UNIT, shown here. Three-way switch 13 is manually actuable by MANUAL ALL OPEN ALL CLOSE unit 32 and is shown set at its intermediate DATA OUT position between its leftmost (grounded) position and its rightmost (Vcc+) position, the consequences of which are described further hereinafter.

It should be understood that each such memory is preferably of conventional random-access, single-bit per location type and that there are as many memories as there are secure programs that can be requested. Thus, if there are five such programs per day requestable up to thirty days in advance, a total of 150 memories would be required. Each memory has a separate and unique location therein corresponding to each subscriber in the set or roster of all subscribers, addressable in suitable manner by numerical designation, as by each subscriber's account number, for example. After a preliminary clearing routine (0's in each location), the memories are updated from time to time with the randomly received and recorded program requests, through the SELECT part of MEMORY SELECT COMMAND unit 47, and for any given memory (corresponding to a particular requested secure program) each requesting subscriber's location therein is addressed and a logical "1" stored as DATA IN. Thus, when the appropriate memory is scanned just before the scheduled time for transmission of a given secure program, via the COUNT part of COUNT OR SELECT unit 42 in serially addressing each subscriber's location therein in synchronism with the clocking pulses, each clocking pulse corresponding to a requesting subscriber is punctuated by a mark or command pulse, thereby converting the string of clocking pulses to a command pulse signal string. Consequences of such evidence that certain subscribers wish to receive the program are described more fully below.

Figure 4:
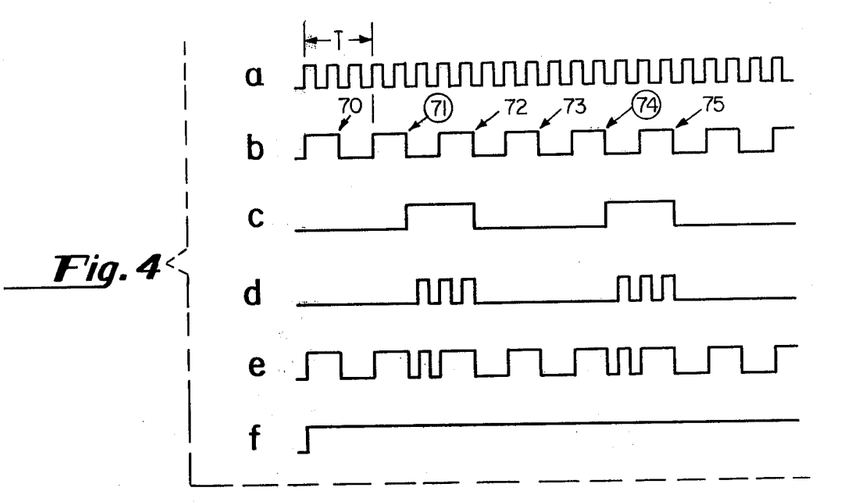
FIG. 4 is a set of graphical representations of signals provided in the access control means of FIG. 3.

FIG. 4 shows graphically a half dozen signal waveforms or pulse strings, designated as a to f, present during operation of the CONTROL UNIT, shown in the last preceding view, at locations therein so indicated. Operation of that unit to provide an unblocking command for each subscriber who has requested (and has paid or is being billed for) a secure program is now described by reference to both FIGS. 3 and 4.

Shortly before transmission of a given secure paid channel program begins, the corresponding memory (here MEMORY 30-1) is selected, as by keying in a memory code via MANUAL KEY-IN unit 31 through MEMORY SELECT COMMAND 47. The MANUAL KEY-IN unit also is useful for keying last minute request data via INTERFACE AND DECODE unit 41 directly into the memory, bypassing the recorders. SQUARE-WAVE GENERATOR 35 provides waveform a, preferably at some medium audio frequency (e.g., 500 Hz.), which is inverted by inverter 36, and then clocks DIVIDE by 3 counter 37 so as to provide waveform b of period T at its Q output, which is fed to COUNTER 43. As indicated, counter 37 is negative edge triggered by the inverted signal and is clocked thereby in synchronism with the output of the square wave generator. BISTABLE unit 38, which is similarly triggered by the inverted signal has its Q output connected to reset R of counter 37 to synchronize it with the positive transition from that signal so that the counter will stabilize before its first useful negative transition input. Such input occurs when a logical zero is placed on the D terminal of the BISTABLE through START TRANSMISSION unit 33, which may be operated manually or automatically, as on a time basis. Signal waveform b now clocks COUNTER 43, which in turn through the COUNT section of unit 42 addresses each location in the memory sequentially and determines whether at each subscriber location a program request has been stored, such as in the form of a logical "1". Those locations containing such a coded request produce an output pulse, two such pulses being shown on signal waveform c, corresponding to subscribers 71 and 74 where the first pulse shown in waveform b corresponds to subscriber 70 and the last pulse shown complete corresponds to subscriber 75. Signal waveform c is anded in AND gate 44 with basic square waveform a, producing signal waveform d, which shows three pulses at each occurrence of the long pulse in c. Signal waveform d is ored with clocking waveform b in OR gate 45, giving split-phase mark composite waveform e in which the second or negative half of the clocking waveform corresponding to each of the requesting subscribers is punctuated by a shorter command pulse, whereupon e is properly designated in its entirety as a program command signal string. AND gate 46 receives both e and the Q̄ output from BISTABLE 38, and functions as a switch, being opened when a logical "1" appears at such output to pass the program command signal string to MODULATOR unit 40 fed with a radio frequency carrier from RF OSCILLATOR unit 39. The RF waveform modulated with the program command signal string is amplified by RF AMPLIFIER unit 34 and then passes along cable 26 (to the junctions with the lead-ins to the respective subscribers' television receivers). As already indicated each subscriber has a tap off between the cable and the subscriber's down lead to the receiver, and the circuitry of such a tap off is shown in more detail in the next view.

Figure 5:
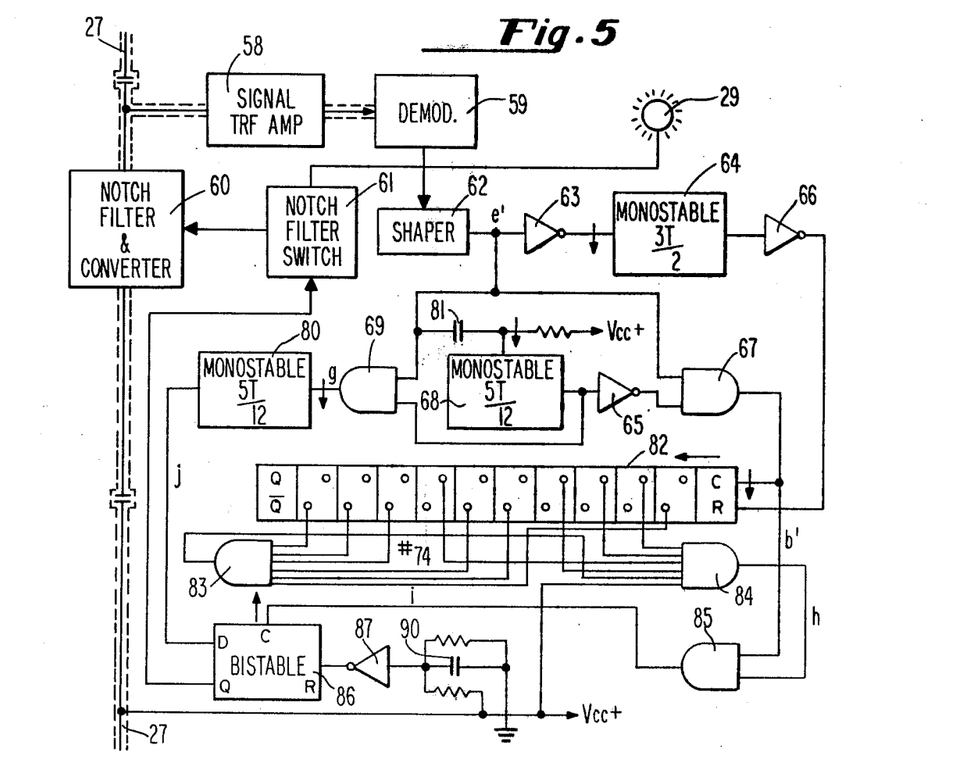
FIG. 5 is a circuit diagram, largely in component block form, of access control means located locally as at the junction of the cable with a lead to a cable television subscriber's television receiver.
Figure 6:
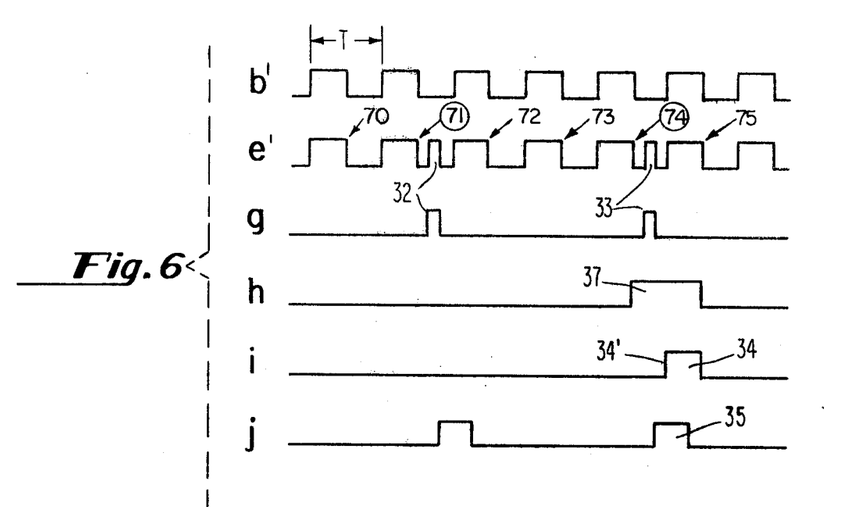
FIG. 6 is a set of graphical representations of signals provided at the FIG. 5 location.

FIG. 5 shows TAP OFF 28 circuitry useful in accordance with this invention, and FIG. 6 shows graphically signal waveforms or pulse strings present during operation thereof. Operation of this unit to unblock program transmission (and to reblock it) to the television set of such subscriber, having requested it, is now described with reference to these last two views.

The first component encountered in down lead 27 from the TAP OFF junction (after a dc blocking capacitor, unnumbered) is the SIGNAL TRF AMPLIFIER unit 58. The amplified output signal is fed to DEMODULATOR unit 59 which extracts command pulse signal string e' (shown after being squared up in SHAPER 62 and so designated to distinguish it from its original counterpart shown in FIG. 4), only a portion thereof being illustrated. The final component interconnecting with down lead 27 to the subscriber's television receiver (except for another unnumbered dc blocking capacitor) is NOTCH FILTER AND CONVERTER unit 60. When active a notch filter acts like the inverse of a bandpass filter, screening out a band of frequencies as by shunting them to ground; when the notch filter is deactivated or switched off, such band of frequencies will be transmitted by it. Between the DEMODULATOR and latter unit is the circuitry so depicted in FIG. 5, which functions as follows:

Demodulated and shaped command pulse signal string e' is fed directly to inverter 63 and to AND gates 67 and 69. AND gate 67 also receives a stretched and inverted version produced by MONOSTABLE 68 (with a time constant of less than T/2, say 5T/12) from the negative excursions of e' after passage through capacitor 81. After inversion by inverter 65, the stretched waveform is combined with e' in AND gate 67 to recover a clocking counterpart b' (FIG. 6) of the original clocking string lacking program command pulses. This string is fed to the count terminal of ripple counter 82 and clocks it accordingly provided that a logical "0" appears at reset input R. This occurs on the first positive transition of signal e' applied through inverter 63 to MONOSTABLE unit 64, which is negative edge triggered and has a time constant greater than T (say, 3T/2) thus maintaining its logical "1" output so long as the signal is present. This output is inverted in inverter 66 and is applied to reset R input of the ripple counter, thus rendering the clocking input effective.

Ripple counter 72 as shown has a capacity of ten bits and is specifically prewired to produce a logical "1" output from AND gate 84 when the count reaches "74" as the exemplified subscriber's serial identification. The wired Q̄ outputs are anded in gate 84, and the wired Q outputs are anded in gate 83, whose output in turn is also applied to AND gate 84. The output of gate 84 is shown in FIG. 6 as signal waveform or single pulse h, which is anded with clocking pulse b' (from gate 67) in AND gate 85 to give a shorter pulse, i, delayed to the rise of the next clocking pulse and whose rising edge triggers BISTABLE unit 86, which transfers the logical state on D input of the BISTABLE to the Q output.

AND gate 69 ands command pulse signal string e' with the signal from MONOSTABLE unit 68, whose time constant is short (e.g., 5T/12), resulting in signal waveform g containing only the requesting subscribers' command pulses, the clocking pulses having been eliminated. Applied to and stretched by MONOSTABLE unit 80, also with a short (e.g., 5T/12) time constant, this gives signal waveform j. Positive edge 34' of pulse 34 shown at i and introduced at C will transfer a logical "1" (when present) from input D to output Q of BISTABLE unit 86, thus rendering the TAP OFF responsive only to this particular subscriber's command pulse rather than to any of the others in the command pulse signal string.

The logical "1" now stable at output Q of the BISTABLE actuates NOTCH FILTER SWITCH 61, which in turn lights reception indicator 29 as well as (more importantly) deactivating the NOTCH FILTER, whereupon transmission of secure PAID CHANNEL(S) programs continues via down lead 27 to the subscriber's television receiver shown in previous views.

Upon conclusion of program transmission the notch filters of all subscribers are readily reactivated to re-block secure program transmission from any of the down leads to the television receivers. The arm of switch 13 (FIG. 3) is moved to the left, disconnecting it from DATA OUT of any memory and connecting it to ground, thereby grounding one of the inputs to AND gate 44. The output from that gate is then a logical "0" (regardless of the other input, which is original square wave a) and when ored with the DIVIDE BY 3 output in OR gate 45 provides the latter (i.e., the clocking pulse string free of command pulses) as output. This output is modulated transmitted over the cable, and demodulated at each subscriber's tap off, the result being that the signal j and input D of BISTABLE unit 86 remain at logical "0" throughout the entire count and, as the count reaches each subscriber's number in turn, the rising edge (54') of pulse 34 in signal waveform i transfers that logical "0" from D to output Q of BISTABLE 86, thus blocking further reception of secure programs by reactivating the NOTCH FILTER part of unit 60. Only about a minute or less is required to unblock the tap offs of subscribers having requested the next program transmission, as already described in detail.

If it should become desirable to open all tap offs so as to transmit any given program (or group of programs) to the television receivers of all subscribers, the arm of switch 13 is thrown to the right so as to provide a logical "1" as the upper input to AND gate 44, which has the original square wave as the lower input. The output from gate 44 ored with the DIVIDE BY 3 output then provides command pulse signal string e having a command pulse punctuating every clocking pulse. Accordingly, when each subscriber's prewired count is reached, the subscriber's notch filter will be deactivated. Upon conclusion of such free transmission further transmission may be blocked with switch 13 moved to the opposite position as already described.

Designation of unit 60 as NOTCH FILTER AND CONVERTER indicates that the unit includes means, such as a frequency converter, whereby a paid channel can be shifted to appear on a channel to which the subscriber's receiver can be tuned in conventional manner. If a band of several different channels is controlled by the notch filter, such as up to five channels between 115 and 165 MHz, the subscriber may choose from among them by switching channel selector 6 to control selection means in the tap off, such as a voltage controlled oscillator (not separately shown). Alternatively, sequential stepping means (also not shown) similarly remotely activated by the subscriber could be employed with like result. Notwithstanding subscriber's control over selection from among unblocked channels it will be understood that the subscriber has no control whatever over unblocking of the transmission except by way of requesting it as first described.

Such security of the access system of this invention is preserved in the face of possible electrical power intermittency or attempts by a subscriber to influence the tap off circuitry through manipulating the electrical power connection via plug 8 (FIG. 2). By ensuring application of a momentary logical "1" (after passage through inverter 87) at reset R of BISTABLE 86 (FIG. 5) the network of resistors 88 and 89 and capacitor 90 in the power lead preclude the presence of an unblocking logical "1" at the Q output of the BISTABLE except as intended by way of a command pulse for the subscriber in the command pulse signal string sent over the cable from the control station at the head end of the cable.

No unusual chemical composition or structural material is required in the practice of this invention, which can be carried out, as disclosed, with only conventional devices to realize high-security cable television access as desired. The beneficial results include dependability of operation without undue complexity, and with ready applicability to existing cable television systems, assuring both broadcaster and subscriber of program security.

It should be understood that the foregoing circuitry disclosure of modular components to carry out the objects of this invention is merely exemplary and that an appropriately programmed minicomputer could be substituted at the head end to provide all the required control functions, including generating the program command signal string, as will be apparent to persons skilled in the art.

Figure 7:
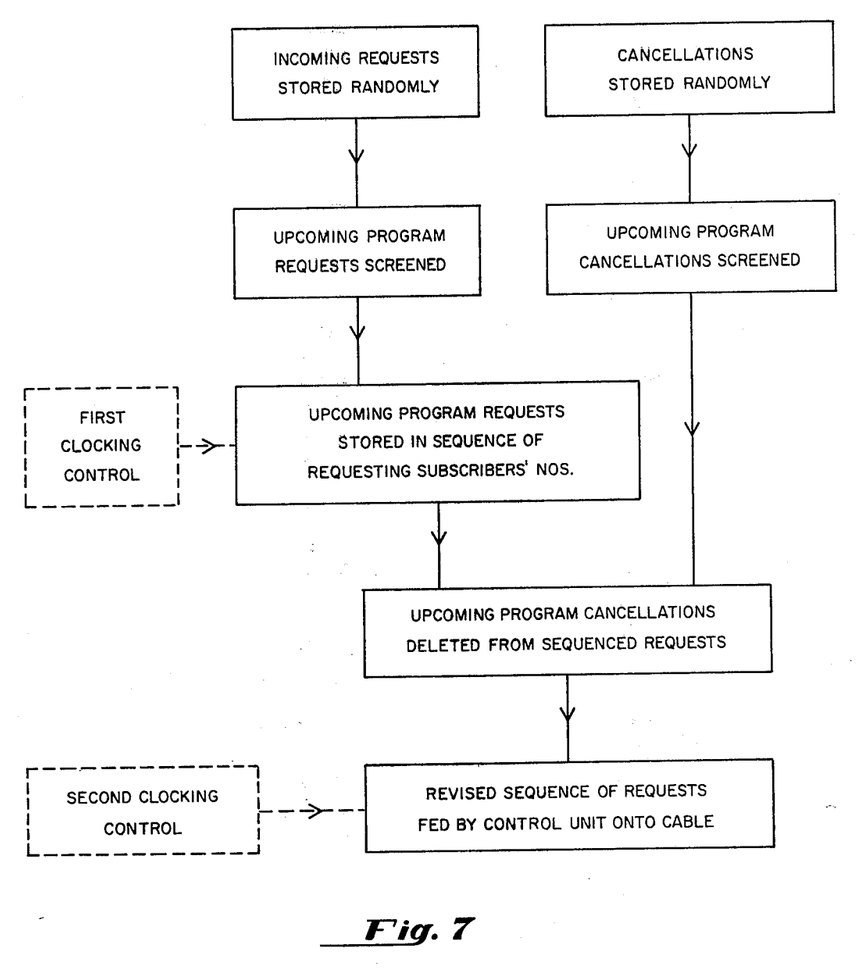
FIG. 7 is a schematic flow diagram of consolidated processing of program requests and cancellations.

FIG. 7 shows schematically the processing of incoming program requests and cancellations consolidated as in an appropriately programmed computer, which may be of general purpose type or specialized for this purpose. Incoming requests for programs are stored randomly, as indicated at the upper left in FIG. 7. Independently, cancellations of program requests are received and stored randomly, as indicated at the upper right. When a particular program is coming up next, the program requests are screened and the requests for the upcoming program are stored in sequence of the requesting subscribers' numbers. Preferably, subject to the indicated first clocking control (located in the control unit, see FIG. 1) request-free pulses at corresponding time intervals (of equal duration individually) are inserted for non-requesting subscribers in the sequence at this point to complete the string; alternatively, such pulses may be provided later by the second clocking control, located in the control unit. The stored cancellations are screened for requests to cancel the upcoming program, and the cancelled program requests are deleted from the sequence of requesting subscribers. The revised sequence of requests is then fed by the control unit onto the cable in the form of a pulse string as in FIG. 1. Each subscriber's sequential time interval in the string is characterized as before by either the presence or the absence of a command pulse, depending upon whether the particular subscriber has requested the upcoming program (and has not cancelled that request) or has failed to do so.

Other modifications may be made, as by adding, combining, or subdividing parts or steps or by substituting equivalents, while retaining advantages and benefits of the present invention, which itself is defined in the following claims.

The claimed invention is:

1. Means for providing, to requesting cable television subscribers, access to requested program signals transmitted over the cable and via interconnections including tap offs and down leads to the subscribers' television receivers, comprising means for generating a string of clocking pulses corresponding to serial numbering of all the subscribers, means for combining program command pulses with the clocking pulses corresponding to the respective requesting subscribers in the clocking string and thereby producing a program command signal string, means for transmitting the program command signal string via the cable to each of the respective requesting subscribers' tap offs, and means at each requesting subscriber's tap off for separating the command pulses from the clocking pulse string, for identifying such subscriber's pulse solely on the basis of time of arrival thereat coinciding with clocking to such subscriber's serial number, and for utilizing the requesting subscriber's command pulse therein to gate the requested program signals to that television receiver.

2. Cable TV access means according to claim 1, including means for modulating a carrier wave with the program command signal string, and means for demodulating the transmitted carrier to recover the program command signal string at the subscribers' tap offs.

3. Cable TV access means according to claim 2, including means for generating at each subscriber's tap off a pulse characteristic of that subscriber's serial number clocked synchronously with the command pulse signal string, and means for utilizing each requesting subscriber's command pulse therefrom, in coincidence with that subscriber's characteristic pulse, to gate the requested program signals to that subscriber's television receiver.

4. Cable TV access means according to claim 1, including means for providing indication of program availability to the respective subscribers for whom the program transmission is gated to their television receivers.

5. Cable TV access means according to claim 4, wherein such means for reception indication includes an illuminatable reception indicator at the tap off of each such subscriber for whom the program transmission is gated to a television receiver.

6. Means for providing, to requesting cable television subscribers, access to requested program signals transmitted over the cable and via interconnections including tap offs and down leads to the subscribers' television receivers, comprising means for providing a memory of requesting subscribers, means for counting serially through all subscribers including non-requesting as well as requesting subscribers in synchronism with the clocking pulses, means for scanning the memory at each clocking pulse and means for generating a command pulse at that time if the subscriber corresponding to such clocking pulse is found in the memory as a requesting subscriber, means for generating a string of clocking pulses corresponding to serial numbering of all the subscribers, means for combining program command pulses with the clocking pulses corresponding to the respective requesting subscribers in the clocking string and thereby producing a program command signal string, means for transmitting the program command signal string via the cable to each of the respective requesting subscribers' tap offs, and means at each requesting subscriber's tap off for separating the command pulses from the clocking pulse string, for identifying such subscriber's pulse solely on the basis of time of arrival thereat coinciding with clocking to such subscriber's serial number, and for utilizing the requesting subscriber's command pulse therein to gate the requested program signals to that television receiver.

7. Cable TV access means according to claim 6, including means for reblocking transmission to the subscribers at the end of transmission of a requested program.

* * * * *